3,070,623
PHARMACOLOGICAL COMPOUNDS
Siegfried Gottfried, Ilford, and Lily Baxendale, London, England, assignors to Biorex Laboratories Limited, London, England, a corporation of the United Kingdom
No Drawing. Filed June 26, 1958, Ser. No. 744,668
Claims priority, application Great Britain July 16, 1957
2 Claims. (Cl. 260—468.5)

This invention comprises improvements in and relating to pharmacological compounds, and more particularly new derivatives of glycyrrhetinic acid.

Glycyrrhetinic acid is obtainable from liquorice root. Compositions containing glycyrrhetinic acid and having a pronounced effect in suppressing inflammation are known. The said compositions are suitable for topical application, glycyrrhetinic acid being only sparingly soluble in water.

We have now found certain derivatives of glycyrrhetinic acid which also have a good effect in suppressing inflammation, and yet are more soluble generally, especially in body fluids, than glycyrrhetinic acid, and are, therefore, more suitable for systemic use than is glycyrrhetinic acid.

According to the invention, there are provided, as new compounds, hydrogen esters of glycyrrhetinic acid and salts of such hydrogen esters. It is to be understood that the new compounds are prepared from non-toxic materials which are compatible with mammals.

The new derivatives of glycyrrhetinic acid are prepared by known methods. Glycyrrhetinic acid derivatives of poly-basic organic acids in which at least one carboxylic acid group of the organic acid remains free, are preferably prepared by refluxing the organic acid with glycyrrhetinic acid in an organic solvent or by the action of an acid anhydride in pyridine solution. Alkali metal salts of these derivatives may be prepared by neutralisation with an aqueous solution of, for example, an alkali metal hydroxide, a carbonate or bicarbonate.

These new compounds have a good effect in suppressing inflammation and may be used in compositions with known additives, such as with inert carriers, to form, for example, an ointment, powder, or emulsion, and may also be compounded with anti-causative agents. Further, the new compounds may be dissolved in suitable solvents, such as water, normal saline or oils, and so make compositions suitable for, for example oral, sub-cutaneous, intramammary, intra-muscular, intra-articular, intra-peritoneal and intravenous use.

Medical, pharmacological, and veterinary tests and trials have been carried out with these new compounds on human beings, small and large animals, as well as pharmacological trials using rats, mice, guinea pigs, rabbits and cats. The new compounds have shown that the hereinafter-described derivatives are active in suppressing inflammation, for example, pharmacological tests carried out as is more particularly described below:

These new compounds heal artificial lesions produced on the skin of rabbits, whether from an external cause, or from intradermal injections of irritant substances.

When applied locally, these new compounds cause rapid subsidence of any inflammation produced by the introduction of irritant substances into the eye of the rabbit.

When applied by systemic injection or by oral administration these new compounds depress the formation of granuloma tissue induced by subcutaneously-implanted cotton wool pellets in rats in the test described by Meier, R., Schuler, W., and Desaulles, P., Experientia, 1950, 6, 469. These new derivatives depress the formation of inflammatory exudate and of the granulomatous membrane in the granuloma pouch test described by Selye, H., Brit. mea. J., 1949, 2, 1129.

When injected systemically into B.C.G.-infected guinea-pigs, the new derivatives suppress the reaction to intradermally-injected tuberculin in the test described by Long, D. A., and Miles, A. A., Lancet, 1950, 1, 492.

In addition, when injected parenterally or administered orally, the new derivatives have a mild depressant action in mice and potentiate the actions of central nervous system depressant drugs such as hexobarbitone.

The new derivatives have mild analgesic and antipyretic actions.

These new compounds are of value in combating inflammatory conditions, such as inflammatory ulcerative conditions of the digestive system, and other inflammatory processes whether they be primary or of secondary cause, or the result of such cause.

As has already been indicated, these new derivatives can be incorporated in various therapeutic forms, such as, ointments, solutions, injections, emulsions, suspensions, pastes, cones, cerates, paints, powders, and implants, all in conjunction with suitable carriers.

The following examples are given for the purpose of illustrating the invention:

A relatively water-soluble material, which has reduced the haemolytic action of glycyrrhetinic acid, has been prepared, being a hydrogen ester, namely glycyrrhetinic acid hydrogen succinate.

EXAMPLE 1

*Glycyrrhetinic Acid Hydrogen Succinate (2-Carboxy-Ethylpropionyl Glycyrrhetinic Acid)*

23.5 grams of glycyrrhetinic acid were dissolved in 50 cc. of dry pyridine. A solution of 6.0 grams of succinic anhydride in 30 cc. of dry pyridine was added, followed by 30 cc. of dry triethylamine and then, for washing purposes, 5 cc. of dry pyridine. The solution was heated on a boiling water bath for ten hours and then poured into excess of dilute hydrochloric acid and ice. The fine grey precipitate formed was filtered off, washed with water, dissolved in chloroform, and the solution repeatedly extracted with dilute hydrochloric acid and later with water. It was dried over sodium sulphate and evaporated to dryness. Crystallisation from methanol, using charcoal to effect decolorisation, gave the hydrogen succinate as cream-coloured crystals, M.P. 291–294°, with previous softening, and $[\alpha]_D^{20}$ +128° in chloroform. The alkali metal salts of glycyrrhetinic acid hydrogen succinate and of the latter with organic bases may be prepared.

New salts of such hydrogen esters have also been prepared.

EXAMPLE 2

*Disodium Salt of Glycyrrhetinic Acid Hydrogen Succinate (Glycyrrhetinic Acid Hemisuccinate, Sodium)*

One molecular proportion of glycyrrhetinic acid hydrogen succinate was ground with a dilute (five percent) aqueous solution containing two molecular proportions of sodium hydroxide. The solution was filtered and evaporated in vacuum over concentrated sulphuric acid. The sodium salt is then obtained as a creamy white water-soluble solid.

EXAMPLE 3

An ointment was prepared by dissolving 2% by weight of the disodium salt of glycyrrhetinic acid hydrogen succinate and 5% by weight of neomycin sulphate in a "Vaseline" (registered trademark) base. The base can also be made from 8% by weight of non-ionic emulsifying wax B.P.C. and 16% by weight of liquid paraffin in water.

EXAMPLE 4

A dusting powder was prepared by intimately mixing 1% by weight of glycyrrhetinic acid hydrogen succinate and 0.1% by weight of diphenylhydramine hydrochloride in lactosum.

EXAMPLE 5

Tablets were prepared containing 0.1 g. glycyrrhetinic acid hydrogen succinate in amylum.

EXAMPLE 6

An implant was prepared by fusion compression of 0.1 mg. glycyrrhetinic acid hydrogen succinate.

What is claimed is:
1. Hemi-esters of glycyrrhetinic acid and the salts thereof which are non-toxic and compatible with mammals.
2. Glycyrrhetinic acid hydrogen succinate and the disodium salt thereof.

References Cited in the file of this patent

UNITED STATES PATENTS

| | | |
|---|---|---|
| 1,796,109 | Kayser et al. | Mar. 10, 1931 |
| 2,273,196 | Hesse | Feb. 17, 1942 |
| 2,410,949 | Karrer | Nov. 12, 1946 |
| 2,698,822 | Halpern et al. | Jan. 4, 1955 |

OTHER REFERENCES

Beaton et al.: Chem. Soc. Jr., 1955 (part 3), pp. 3126–9.

Merck Index, 6th edition (1952), p. 470.

Mitchell: Mgf. Chemist, 169–172.